United States Patent [19]
Castro et al.

[11] Patent Number: 5,428,392
[45] Date of Patent: Jun. 27, 1995

[54] STROBING TIME-DELAYED AND INTEGRATION VIDEO CAMERA SYSTEM

[75] Inventors: Peter S. Castro; David L. Gilbolm, both of Los Altos, Calif.

[73] Assignee: Picker International, Inc., Highland Heights, Ohio

[21] Appl. No.: 59,647

[22] Filed: May 10, 1993

Related U.S. Application Data

[63] Continuation-in-part of Ser. No. 979,633, Nov. 20, 1992.

[51] Int. Cl.⁶ .................... H04N 7/18; H04N 9/10
[52] U.S. Cl. ........................... 348/295; 348/294; 348/297; 348/92
[58] Field of Search ............... 348/294, 295, 297, 298, 348/303, 304, 311, 312, 92, 96, 148, 155, 166, 167, 168, 36; H04N 7/18, 9/10

[56] References Cited

U.S. PATENT DOCUMENTS

| | | | |
|---|---|---|---|
| 3,833,762 | 9/1974 | Gudmundsen | 178/7.1 |
| 4,278,999 | 7/1981 | Ganguly et al. | 348/96 |
| 4,382,267 | 5/1983 | Angle | 348/295 |
| 4,639,774 | 1/1987 | Fried | 348/155 |
| 4,934,810 | 6/1990 | Nagele et al. | 356/1 |
| 4,949,172 | 8/1990 | Hunt et al. | 348/92 |
| 5,101,266 | 3/1992 | Schlig et al. | 348/295 |
| 5,229,852 | 7/1993 | Naietta et al. | 348/441 |
| 5,231,502 | 7/1993 | Pfister | 348/295 |
| 5,262,852 | 11/1993 | Eouzan et al. | 348/148 |

OTHER PUBLICATIONS

"Time Delay and Integration Image Sensor", Barbe, Solid State Imaging, Noordhoff International Publishing, Leyden, The Netherlands, 1975, pp. 659-671.

"Charge-Coupled Device and Charge-Injection Device Imaging", Barbe, Journal of Solid-State Circuits, vol. SC-11, No. 1, Feb., 1976, pp. 109-114.

"Signal Processing For Time Delay and Integrating Charge-Coupled Device (TDI-CCD) in the Panoramic Scan Mode", Sadowski, SPIE vol. 282 (1981), pp. 115-128.

"Large Time-Delay-and-Integration (TDI) Arrays and Focal Plane Structures With Intrinsic Silicon Response", Dyck, et al., SPIE vol. 282 (1981).

"Long Range E-O Reconnaissance System and Flight Test Results", Palazzo, SPIE vol. 561, (1985), pp. 13-17.

"A 128×1024 Element TDI Image Sensor with Small, High Performance Pixels", Dyck, et al., SPIE vol. 901 (1988), pp. 3-9.

(List continued on next page.)

*Primary Examiner*—Tommy P. Chin
*Assistant Examiner*—Vu Le
*Attorney, Agent, or Firm*—Fay, Sharpe, Beall, Fagan, Minnich & McKee

[57] ABSTRACT

A time-delay and integration camera assembly (A) is mounted to view a rotating or other cyclically moving object (B). A lens (30) focuses light from a field of view (10) onto an array (32) of light sensitive elements having N lines of elements. A tachometer (50) monitors rotation of the rotating object and a timing control (54) causes a light sensitive array control (34) to start stepping lines of data along the lines of light sensitive elements toward a shift register (36) as a leading edge (20) of a region of interest (12) enters the field of view. Each time the region of interest moves 1/Nth of the way across the field of view, the lines of data are stepped another time along the lines of light sensitive elements. Digital video signals are sorted (74) among a plurality of image memories ($76_1$, $76_2$, ..., $76_M$) each image memory corresponding to a corresponding region of interest ($12_1$, $12_2$, ..., $12_M$). Scan converters (80) convert the frame image representations in the image memories into a series of human-readable displays. In this manner, the image memory corresponding to each region of interest is updated with each revolution of the object (B) to produce a cinematic video strobe image in a constantly illuminated environment.

15 Claims, 3 Drawing Sheets

OTHER PUBLICATIONS

"CCD Imaging Array Combining Fly-s-Eye Lens with TDI for Increased Light-Gathering Ability", Pennington, et al., IBM Technical Disclosure Bulletin, vol. 21, No. 2, Jul. 1978.

"A TDI Charge-Coupled Imaging Device for Page Scanning", Schlig, IEEE Journ. of Solid-State Circuits, vol. SC-21, No. 1, Feb. 1986, pp. 182–186.

"A Spatial Image Separator for Color Scanning", Gutleben, et al., SPIE vol. 809 (1987), pp. 52–54.

"Self-Scanning CCD Image Sensors Operating As Optoelectrical Transversal Filters", Kleinmeier.

"Document Scanning With a New Family of Experimental High-Performance TDI-CCD Imaging Devices", Yao, et al., Electronic Imaging '88 Int. Electronic Imaging Exposition and Conference, Advance Printing of Paper Summaries, vol. 2, (1988), pp. 566–570.

"TDI Charge-Coupled Devices: Design and Applications", Wong, et al., IBM J. Res. Develop. vol. 36, No. 1, Jan. 1992, pp. 83–106.

"Signal-to-Noise Ratio Dependence on Frame Time, Time Delay and Integration (TDI), and Pulse Shaping", Cox, SPIE vol. 244, (1988), pp. 167–181.

"A Buttable 2048×96 Element TDI Imaging Array", Ellul, et al., SPIE vol. 501 (1984), pp. 117–127.

"Charge Imaging Matrix For Infrared Scanning", Borrello, et al., SPIE vol. 409 (1983), pp. 69–75.

"Time-Delay-and-Integration Charge Coupled Devices (CCDs) Applied to the Thematic Mapper", Thompson, et al., SPIE vol. 143, (1978), pp. 19–27.

"The Application of CCD Detectors to UV Imaging From a Spinning Satellite", Murphree, et al., SPIE vol. 932 (1988), pp. 42–49.

"P8602 Charge Coupled Device (CCD) Image Sensor", 1984 English Electric Valve Company Limited, Feb. 1984, pp. 1–4.

"Diverse Electronic Imaging Applications For CCD Line Image Sensors", Hunt, et al.

"A Time Delay and Integration CCD For a Serial Scanned IR Imager", Vanstones, et al., pp. 315–325.

"10,240 Pixel Focal Plane with Five Butted 2,048×96 Element TDI CCDs", Bradley, et al.

"Performance of Charge-Coupled Device (CCD) Imaging Sensors", Monro.

"An Ultraviolet Auroral Imager For the Viking Spacecraft", Anger, et al., Geophysical Research Letters, vol. 14, No. 4, pp. 387–390, Apr., 1987.

"Moving Target Sensors", Final Report, Contract No. N00039-73-C-0070, Prepared For: Dept. of the Navy, by Texas Instruments Incorp., 29 Oct. 1973.

"TDI-CCD Devices in Document Scanning", Pennington, SPSE·Inx. Conf. Electron. Imaging, Nov. 1980, (full paper not published).

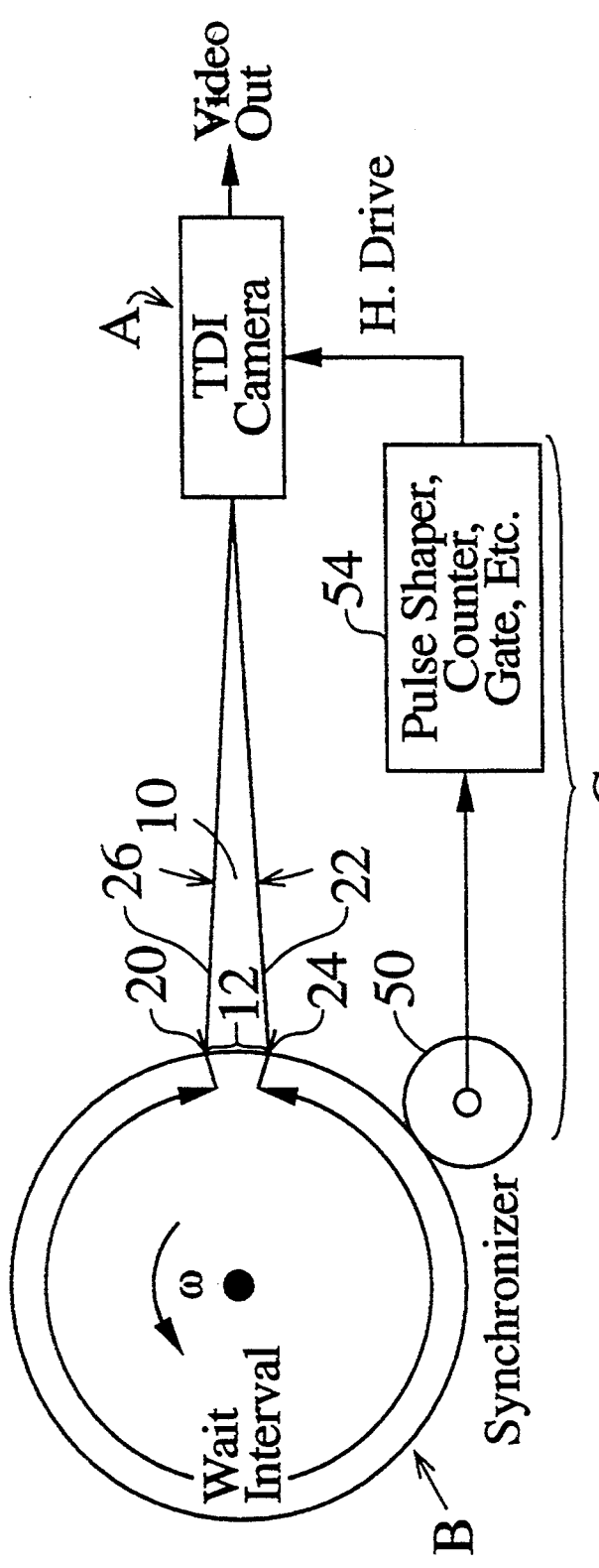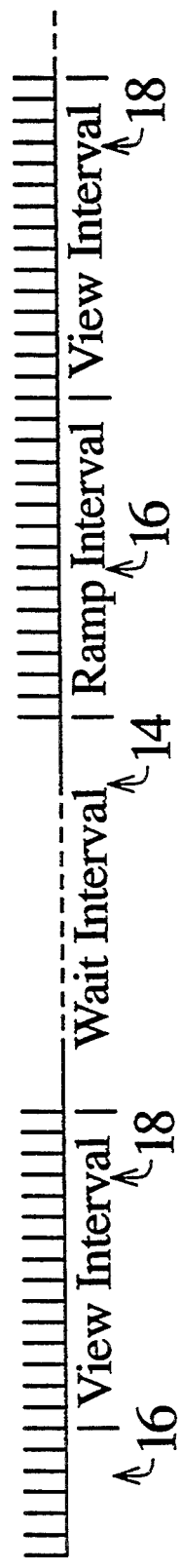

STROBING TIME-DELAYED AND INTEGRATION VIDEO CAMERA SYSTEM

This application is a continuation-in-part of U.S. application Ser. No. 07/979,633 filed Nov. 20, 1992.

BACKGROUND OF THE INVENTION

The present application relates to the video arts. It finds particular application in conjunction with video strobe systems and will be described with particular reference thereto. However, it is to be appreciated, that the present invention will also find application in conjunction with the monitoring of rotating or cyclically repeating constructions.

Heretofore, strobe lights have commonly been used for monitoring rotating, cyclically moving, and randomly moving objects or constructions. Typically, the strobe light includes a high intensity light source which is pulsed very rapidly, typically 10–15 microsecond pulses. The high intensity light is flashed synchronously with the rotation of the construction to be examined. This causes the same portion of the construction to be illuminated in each rotation or cycle. Because only the same segment of the construction is repeatedly illuminated in every revolution or cycle, the viewer, whether the human eye or an opto-electrical device or photographic film, "see" the same segment of the construction in each rotation or cycle as if it were standing still.

The use of strobe lights had several drawbacks. First, the strobe lights required high intensity, 10–15 microsecond light pulses. Few light sources could produce such short pulses. Second, photographic cameras were generally required for making permanent records. Third, because strobe lights tended to interfere with each other, only one could be utilized at a time in a given area. Moreover, strobe lights were not conducive to use with video cameras. A lack of synchronization between the vertical refresh rate and the strobe light led to dark banding and other artifacts in a video image.

The present invention contemplates a new and improved video strobe system which overcomes the above-referenced problems and others.

SUMMARY OF THE INVENTION

In accordance with the present invention, a time-delayed and integration camera or imaging system is oriented such that its rows are perpendicular to a direction of movement of a moving structure. A synchronizing means is connected between the moving object and the TDI camera to initiate operation of the TDI camera at a selected position of the moving object. In this manner, the TDI camera generates a stop-action video image of the selected surface portion of the object.

In accordance with a more limited aspect of the present invention, the object rotates. The synchronizing means initiates operation of the TDI camera at the same selected angular position of the object in each revolution.

In accordance with another aspect of the present invention, the TDI camera is controlled by an adjustable timing means for starting the TDI camera at adjustable intervals. The timing means is adjusted until a desired portion of the rotating object is imaged and the image held stationary.

In accordance with another aspect of the invention, the synchronizing means is connected with an illumination source. The illumination source is activated for a relatively long duration, e.g. 10 milliseconds, to provide additional illumination during the operation of the TDI camera.

In accordance with another aspect of the present invention, the TDI camera is initiated as the surface area of interest reaches an edge of the TDI camera's field of view and the first N lines read out of the image section are discarded.

In accordance with another aspect of the present invention, a strobing camera system is provided. A lens focuses light from a field of view onto a light sensitive element array having N lines of light sensitive elements. A light sensitive element controlling means shifts lines of data along the lines of light sensitive elements of the light sensitive array. A synchronizing means monitors cyclic movement of an object to be examined and causes the light sensitive element control means to commence shifting lines of data in response to a preselected surface portion of the object entering the field of view. The synchronizing means further causes the light sensitive element control means to shift the lines of data by one line of light sensitive elements each time the selected surface portion of the viewed object moves on 1/Nth of a distance across the field of view.

One advantage of the present invention is that it is usable under slowly pulsed, oscillating, or constant illumination.

Another advantage of the present invention is that it produces a video format signal which is readily stored, edited, or further processed.

Another advantage of the present invention is that it is ideally suited for monitoring rotating constructions. For example, the present invention is amenable to monitoring a multi-vial centrifuge to monitor each vial as it moves past, to monitor rotating machinery, and the like.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components and in various steps and arrangements of steps. The drawings are only for purposes of illustrating a preferred embodiment and are not to be construed as limiting the invention.

FIG. 1 is a diagrammatic illustration of a strobographic video system in accordance with the present invention;

FIG. 2 is a timing diagram which illustrates the clocking or timed control of the TDI camera;

DETAILED DESCRIPTION OF THE PREFERRED EMBODIMENTS

Figure 3:
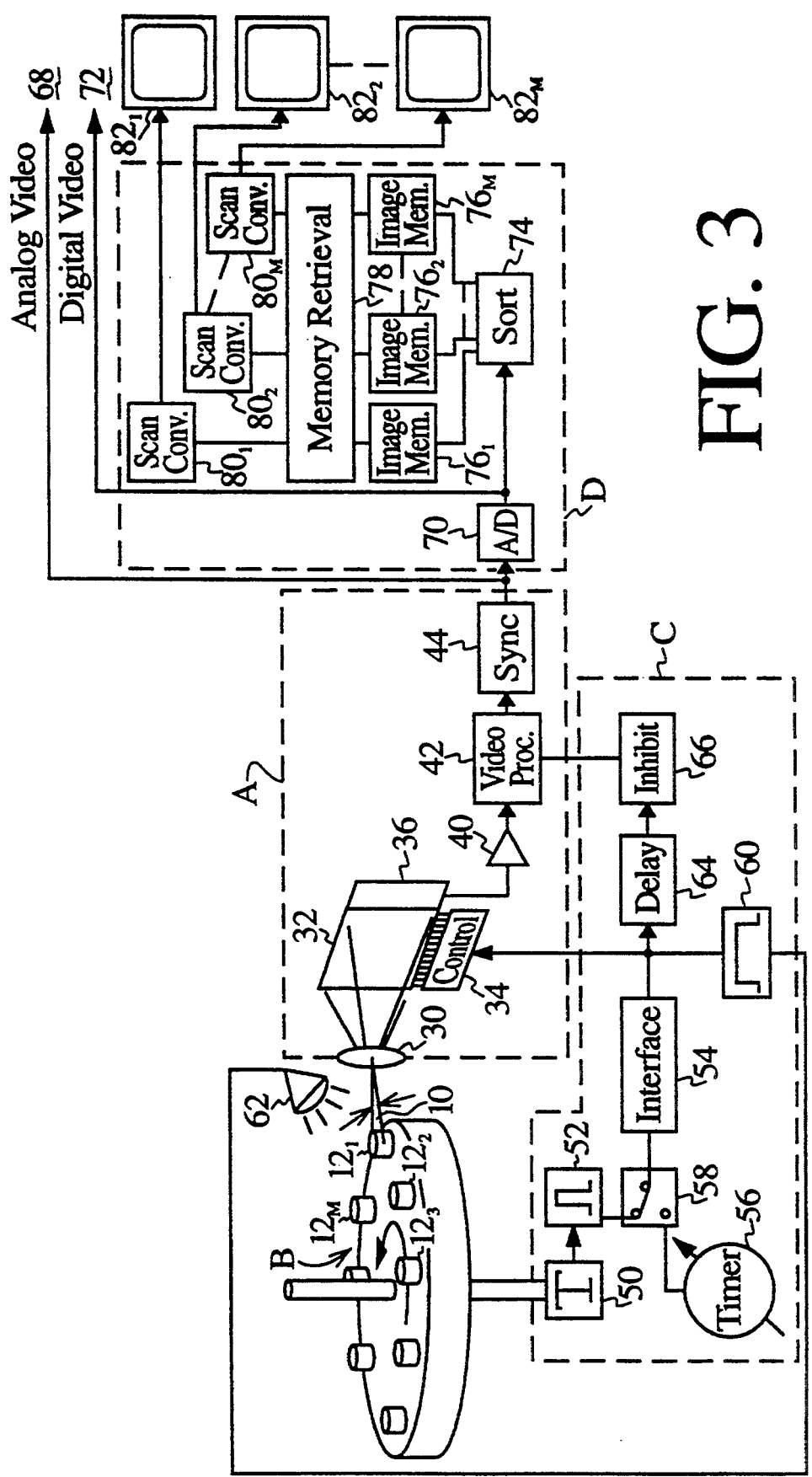
FIG. 3 is a detailed illustration of a variation of the strobing TDI camera system of FIG. 1; and, FIG. 4 illustrates an alternate embodiment in which the examined objects arrive randomly.

With reference to FIG. 1, a time-delay and integration (TDI) camera means A converts light received from a field of view 10 into a corresponding electronic video signal. A viewed object B rotates or undergoes other periodic motion with an angular velocity $\omega$. A timing and control means C coordinates the shifting of lines or rows of data along the TDI camera means A with the rotation of the object B to be viewed such that the same region of interest 12 is viewed in each rotation. In particular, the timing and control means C actuates the TDI camera means A with the appropriate periodicity and for the appropriate duration to generate a video image of the region of interest each time it enters the field of view 10.

With reference to FIGS. 1 and 2, the timing and control means C monitors the movement of the object B to be viewed to define a wait interval 14, a ramp up interval 16, and a view interval 18. The wait interval 14 corresponds to the duration which the region of interest needs to rotate around and return to the field of view 10. The ramp up period 16 provides a duration for clearing the image sensor of image data which does not correspond to the field of view of interest. For example, with a 244 line image chip, the image chip may be actuated as a leading edge 20 of the region of interest reaches the edge 22 of the field of view 10. The first 244 lines of data are discarded during the ramp up period. 244 lines after the leading edge 20 of the region of interest passes field of view edge 22, the view interval 18 commences. The leading edge 20 of the region of interest 12, having been integrated over 244 samplings, is read out as a first line of the video data. For a 244 line video image, the view interval 18 is preferably 244 lines long. The timing and control means is coordinated with the rotation of the object such that a trailing edge 24 of the view of interest reaches edge 26 at the other end of the field of view as the 244th line of data is clocked from the TDI camera means. For a 244 line image, 244 lines of data are sampled at even intervals in the time duration between the leading edge 20 of the region of interest reaching edge 22 of the TDI sensor's field of view 10 and the trailing edge 24 of the region of interest reaching the other edge 26 of the field of view. Images with more or fewer lines of data may be generated analogously for better resolution or higher speed. Optionally, supplemental illumination may be provided from the time the leading edge reaches the field of view until the trailing edge clears the field of view.

With reference to FIG. 3, the rotating construction B is a centrifuge which includes M vials spaced at even angular intervals $360/M°$ apart. Each of the vials constitutes a region of interest. In this manner, there are M regions of interest $12_1, 12_2, \ldots, 12_M$ spaced at even angular increments on the rotating construction.

A lens assembly 30 focuses light from the field of view 10 defined by field of view edges 22, 26 onto an image sensor 32. The image sensor preferably includes a plurality of CCD or other light sensitive elements arranged in a regular rectangular array having N lines of light sensitive elements. In one embodiment, the light sensitive array includes a conditional RS-170 CCD array which has 244 lines or rows of light sensitive elements with 600 elements per line, i.e. N=244. For higher resolution, larger CCD arrays may be provided. The rows or lines are oriented parallel to an axis of rotation of the regions of interest, i.e. perpendicular to the direction of movement of the vials through the field of view. In this manner, as a line at the leading edge 20 of a region of interest sweeps between field of view edges 24, 26, the lens scans the leading edge progressively to each line of CCD elements starting at the viewer's left of array 32 and shifting to the right, as oriented in FIG. 3. For an N=244 line sensor, data is clocked one line along the CCD array each time the leading edge 20 of the region of interest (or other preselected portion of the object) moves 1/Nth, i.e. 1/244th, of the way between the edges 22, 26 of the field of view. In this manner, a 244 line video image frame of each of the regions of interest $12_1, 12_2, \ldots, 12_M$ are generated in each rotation. By displaying these frames serially, a time progression "motion picture" of each region of interest is generated. To generate higher resolution video images of each region of interest, the field of view 10 is contracted to, for example, half the arc spanned by one of the vials. 2N, e.g. 488 lines are read from the CCD sensor 32 to generate each video image frame. The resolution can be adjusted by other integer and fractional multiples of the N lines. Analogously, the size of the region of interest can be adjusted without adjusting the resolution by collecting more or fewer lines per frame with the same timing.

Preferably, the image sensor 32 is a color sensor. That is, the sensor has three CCD elements for each pixel of the resultant image. Prisms, filters, or the like render each element corresponding to the same pixel sensitive to only one of red, green, or blue light (for an RGB monitor). Other triadic color schemes may, of course, be used. As yet another option, additional CCD elements may be provided corresponding to each pixel. The additional elements may have a phosphor, or the like, which is responsive to invisible wavelengths of radiation, such as ultraviolet, infrared, x-ray, and the like. In this manner, color, infrared, and UV images of each of the views of interest can be acquired simultaneously. A pulsed illumination source may be provided to increase the illumination intensity during imaging.

A control means 34 controls the shifting of the rows or lines of data along the sensor array 32 as described above. A shift register 36 receives each line of data as it is clocked out of the sensor array 32. The shift register is clocked at a rate faster than the shift register to serialize each line of data. For example, for a sensor array which has 600 elements per line, the shift register is clocked 600 times between each time the sensor array 32 is clocked. In this manner, the output of the shift register is a multiplicity of lines of serialized video data which when taken together, represent an image.

The output of the shift register 36 is conveyed to an amplifier 40 which amplifies the analog output of the shift register. A video processing channel 42 further processes the video signal with a bandpass filter for removing any vestiges of the clock signal noise, a gain amplifier, a clamping means for restoring DC video, and the like. A synchronization means 44 adds blanking signals at the end of each line of data. In the TDI mode, no frame or "vertical" retrace synchronization signals are required. The output signal is a continuous image which may be displayed on a single monitor having sufficient lines of resolution or which may be subdivided into appropriate frames at a later point in the processing.

Suitable TDI imaging means for use in the present invention are found in U.S. Pat. Nos. 5,040,057; 4,949,172, and 4,922,337, the disclosures of which are incorporated herein by reference.

The timing and control means C includes a synchronization means 50 such as a tachometer which generates tachometer pulses for identifying the leading edge of each of the regions of interest. The synchronization means can also sense directly the movement of each vial 12 into the field of view, e.g. a mechanically actuated switch. A pulse shaping means 52 shapes the pulses to an appropriate shape for further circuitry. An interface means 54 interfaces between the pulses from the tachometer and the control means 34. Various interface means may be provided. For example, the interface means may include a counter which starts an imaging cycle after each preselected number of tachometer pulses. Various other dividers, gates, and the like may also be provided.

Particularly for a construction which is rotating at a constant speed, the TDI pick up assembly A may be clocked periodically. An adjustable timer or clock means 56 can be used to trigger the beginning of each image. A switch means 58 enables either the adjustable timer 56 or the tachometer 50 to be selected.

For optional added illumination, a light source timing means 60 such as a pulse shaper which produces a comparable duration pulse, turns on an illumination source 62 from the time the leadings edge 20 enters the field of view until the trailing edge 24 clears the field of view. A pulse of about 10 milliseconds is preferred for typical applications. A pulse which is longer that the imaging period does not degrade the resultant image.

As indicated above, the first series of lines from the sensor array 32 are preferably discarded. To this end, a delay means 64 is provided. From the above-discussed 244 line preferred embodiment of the sensor array 32, the delay means corresponds to the time required to clock the first 244 lines from the sensor array. The delay means is connected with a video processor inhibiting means 66 for inhibiting the video processor 42 from processing the first N lines of data, 244 in the preferred embodiment. Optionally, other techniques may be utilized for causing the first 244 lines of data from the sensor array 32 to be discarded.

A digital processing and memory means D stores processes and generates displays of all or a portion of each of the regions of interest. An analog video output enables the output of the TDI camera means A to be displayed directly. An analog-to-digital converter digitizes each line of video data from the TDI camera means A. The digital video signal can be displayed directly on a digital video output 72. A sorting means 74 gated by the timing and control means C causes the lines of video data corresponding to each of the regions of interest $12_1, 12_2, \ldots, 12_M$ to be stored in corresponding ones of frame image memories $76_1, 76_2, \ldots, 76_M$. A memory retrieval means 78 selectively causes the video image frames stored in the image memories to be retrieved. A scan converter 80 or a plurality of scan converters $80_1, 80_2, \ldots, 80_M$ are provided for converting each image from a corresponding one of the image memories to be converted to the appropriate format for display on a video monitor 82 or series of video monitors $82_1, 82_2, \ldots, 82_M$. The scan converter 80 causes the corresponding video monitor to receive the frame images stored in the corresponding video memory 76 a plurality of times as dictated by the refresh rate of the video monitor. Once per revolution of the rotating construction B, the image frame in the image memory is updated. In this manner, each of the video monitors displays in a stop-action image the contents of each of the M vials and is updated once per revolution.

Figure 4:
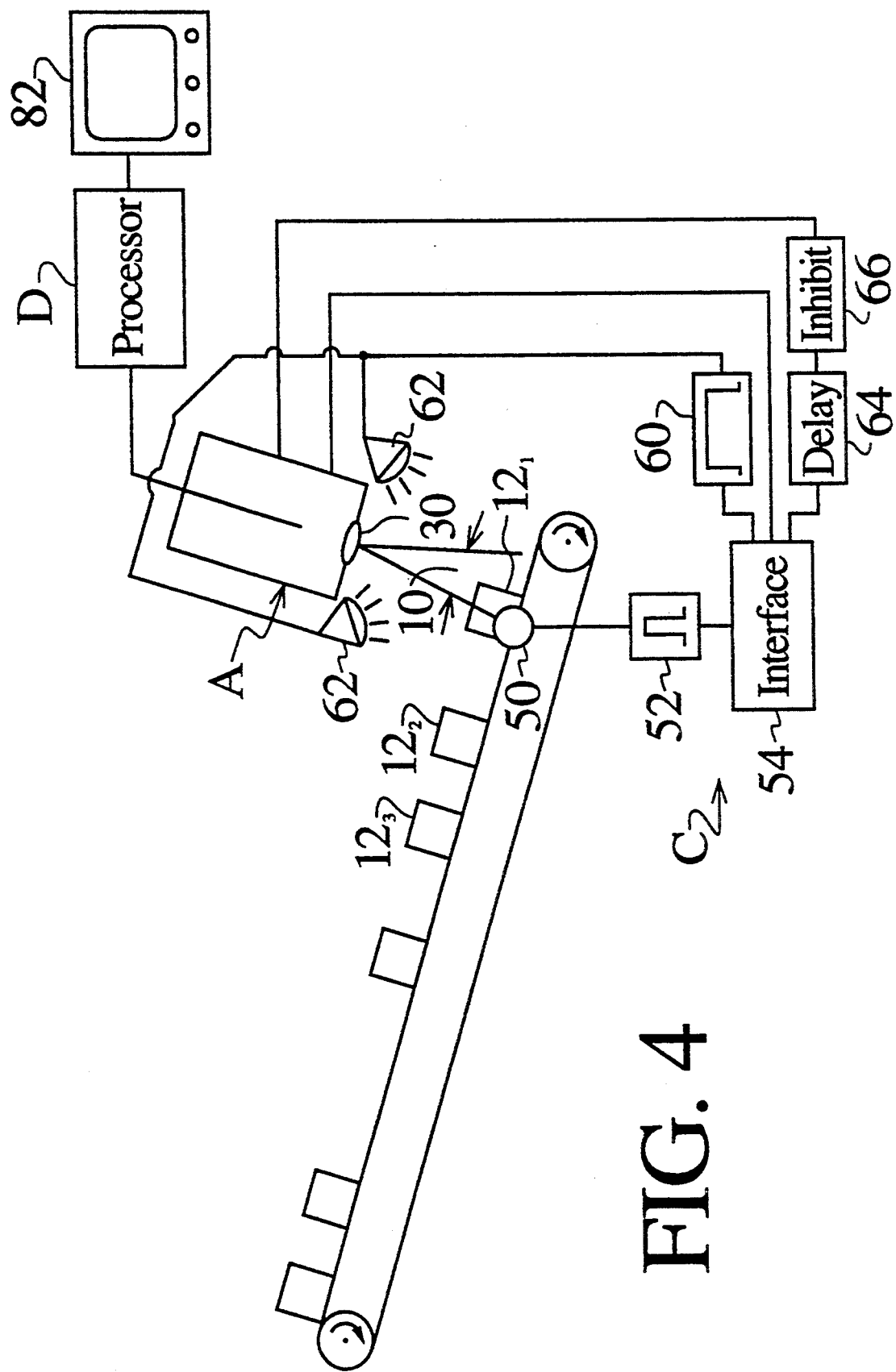

With reference to FIG. 4, the objects $12_1, 12_2, \ldots$, arrive at random or irregular intervals on a conveyor belt or chute 90. The synchronizing means 50 includes a means such as a mechanical finger or an optical beam and photosensor which is broken by the moving object to sense an object moving into the field of view 10. The control means C controls the TDI camera means A analogously to the embodiment of FIG. 3. Additionally, the interface means 54 actuates an illumination control means 60 such that lights 62 illuminate the object in the field of view during the imaging process. The output of the camera means is processed by the processing means D to generate a stop-action image of each examined object on a video monitor means 82.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A strobing camera system for monitoring a cyclically moving object which cyclically moving object includes at least first and second regions of interest, the first and second regions of interest each sweeping alternately and periodically through a field of view, the camera system comprising:
   a lens for focusing light from the region of interest of the cyclically moving object in the field of view onto a light sensitive element array having lines of light sensitive elements;
   a light sensitive element control for shifting lines of data along the lines of light sensitive elements of the light sensitive element array;
   a cyclic motion monitor for producing signals indicating when each region of interest enters the field of view;
   a synchronizing means for causing the light sensitive element control to step the lines of data along lines of light sensitive elements in coordination with each region of interest sweeping across the field of view such that in each cycle of movement of the object, lines of data representing the same first and second regions of interest are produced.

2. The system as set forth in claim 1 further including a video processor for converting the lines of data from the light sensitive element array into analog video signals.

3. The system as set forth in claim 2 further including an analog-to-digital converter for converting the analog video signals into digital video signals.

4. The system as set forth in claim 3 further including a sorting means controlled by the synchronizing means for sorting digital video signals corresponding to the first region of interest into a first image memory and video signals corresponding to the second region of interest into a second image memory.

5. The system as set forth in claim 4 further including a scan converter for converting the image data in the first and second image memories into human-readable displays.

6. The system as set forth in claim 1 wherein the light sensitive element array includes a shift register into which each of said lines of data is shifted after having been shifted through each of the lines of light sensitive elements, the light sensitive element control clocking the shift register at a sufficiently high rate that all data of the data line in the shift register are clocked out serially before a next line of data is clocked into the shift register.

7. A video strobing method comprising:
   focusing light from a rotating object in a field of view onto a light sensitive element array of a time-delayed and integration camera;

orienting the time-delayed and integration camera such that the light sensitive element array has rows of light sensitive elements parallel to an axis of rotation of the rotating object;

periodically, at a selected angular position of the rotating object, initiating operation of the time-delayed and integration camera such that lines of data are shifted along the lines of light sensitive elements in coordination with rotation of a region of interest of the rotating object until the region of interest has rotated into and through the field of view such that the time-delayed and integration camera generates a video image of the region of interest in each rotation, which video image rolls unless the rotating of the object and the periodic initiating of the time-delayed and integration camera are synchronized;

synchronizing the rotating of the object and the periodic initiating of the time-delayed and integration camera.

8. The method as set forth in claim 7 wherein the light sensitive element array has N lines of light sensitive elements and wherein the first N lines of data are discarded, where N is an integer.

9. The method as set forth in claim 8 wherein the N+1st through 2N lines of data are converted into a frame of the video image.

10. The method as set forth in claim 7 further including:

controlling a starting of the shifting of rows of data such that the shifting of the rows of data starts at adjustable time intervals;

with the object rotating at a constant rotation speed, adjusting the time interval to match the rotation speed causing the region of interest to stand stationary in the displayed image on the monitor.

11. A strobing camera system comprising:

a lens for focusing light from a field of view in which a cyclically moving object rotates about an axis onto a light sensitive element array having lines of light sensitive elements;

a light sensitive element control means for shifting lines of data along the lines of light sensitive elements of the light sensitive element array;

a rotation monitoring means for producing signals indicating each time at least one preselected surface portion of the rotating object reaches the field of view;

a synchronizing means for causing the light sensitive element control means to commence shifting lines of data in response to the rotation monitoring means signals indicating that the preselected surface portion of the object is entering the field of view, for causing the light sensitive element control means to shift the lines of data in coordination with movement of the preselected surface portion of the viewed object across the field of view, and for causing the light sensitive element control means to stop the shifting of lines of data when the preselected surface portion has exited the field of view.

12. The system as set forth in claim 11 further including a video processing means for converting the lines of data from the light sensitive element array into analog video signals.

13. The system as set forth in claim 11 further including:

a light source for selectively illuminating the preselected surface portion in the field of view;

an illumination control for controlling the light source such that the preselected surface portion is illuminated for a duration of time during which any portion of the preselected surface portion is in the field of view.

14. A strobing camera system for monitoring a cyclically moving object having at least one region of interest that periodically sweeps through a field of view, the camera system comprising:

a lens for focusing light from the field of view onto a light sensitive element array having N lines of light sensitive elements, where N is an integer;

a light sensitive element control for shifting lines of data along the lines of light sensitive elements of the light sensitive element array;

a synchronizing means for monitoring cyclic movement of the region of interest of the object for causing the light sensitive element control to commence shifting lines of data in response to the region of interest of the object reaching a position N lines of data from the field of view, for discarding a first N lines of data, and for causing the light sensitive element control means to shift the lines of data by one line of light sensitive elements each time the region of interest of the viewed object moves 1/Nth of a distance across the field of view;

a video processor for converting a second N lines of data from the light sensitive element array from each periodic sweep of the object through the field of view into a stop-action image of the at least one region of the object.

15. A strobing camera system for monitoring a cyclically moving object having at least one region of interest that periodically sweeps through a field of view at object periodic time intervals, the camera system comprising:

a lens for focusing light from the field of view onto a light sensitive element array having lines of light sensitive elements;

a light sensitive element control for shifting lines of data along the lines of light sensitive elements of the light sensitive element array;

a video processor for converting the lines of data from the light sensitive element array into video signals;

a video monitor for converting the video signals into a human readable picture;

an adjustable timer for causing the light sensitive element control to start and stop the shifting of lines of data at selectively adjustable, timer periodic time interval, such that when the adjustable timer periodic time interval is different from the object periodic time interval, the human-readable picture rolls and when the adjustable timer periodic time interval match the object periodic time interval, the human-readable picture system stops rolling;

a means for adjusting the timer periodic time interval such that the timer periodic interval matches the object periodic interval.

* * * * *